United States Patent
Hönig et al.

(10) Patent No.: US 6,789,652 B2
(45) Date of Patent: Sep. 14, 2004

(54) RESILIENT LEG

(75) Inventors: Michael Hönig, Ennepetal (DE); Walter Wirtz, Gevelsberg (DE); Marcello Di Fina, Bochum (DE); Klaus Hofmann, Gevelsberg (DE); Günter Poetsch, Schwelm (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 19 days.

(21) Appl. No.: 10/357,525

(22) Filed: Feb. 3, 2003

(65) Prior Publication Data

US 2003/0146060 A1 Aug. 7, 2003

(30) Foreign Application Priority Data

Feb. 5, 2002 (DE) .......................................... 102 04 590

(51) Int. Cl.[7] .................................................. F16F 9/00
(52) U.S. Cl. .................................. 188/312; 188/322.16
(58) Field of Search ....................... 188/322.22, 322.13, 188/322.15, 321.11, 269, 282.5, 312, 322.16; 267/64.11–64.28, 225, 127, 150, 226, 128

(56) References Cited

U.S. PATENT DOCUMENTS

| | | | | | |
|---|---|---|---|---|---|
| 2,992,815 | A | * | 7/1961 | Ellis, Jr. | 267/225 |
| 3,131,921 | A | * | 5/1964 | Karbowniczek | 267/128 |
| 4,459,261 | A | * | 7/1984 | Kolodzey et al. | 267/177 |
| 4,867,286 | A | * | 9/1989 | Taylor | 188/282.5 |
| 5,829,556 | A | * | 11/1998 | Domange | 188/312 |

* cited by examiner

Primary Examiner—Robert A. Siconolfi
Assistant Examiner—Melanie Torres
(74) Attorney, Agent, or Firm—Max Fogiel

(57) ABSTRACT

A resilient leg as part of an attachment for the wheel of a motor vehicle. The leg is provided with a piston rod (4) that has a piston (5) attached to it, that travels into and out of a housing (1), that is attached at its outer end to the vehicle's chassis, and that is maintained in radial alignment by two separated bearings. The piston divides the interior of the housing into two fluid-charged chambers (9 & 10). The object is to ensure satisfactory transmission of moments of force from the piston rod to the housing in a leg that is light in weight. The piston rod accordingly extends through, and is maintained in radial alignment at, both ends of the leg.

6 Claims, 1 Drawing Sheet

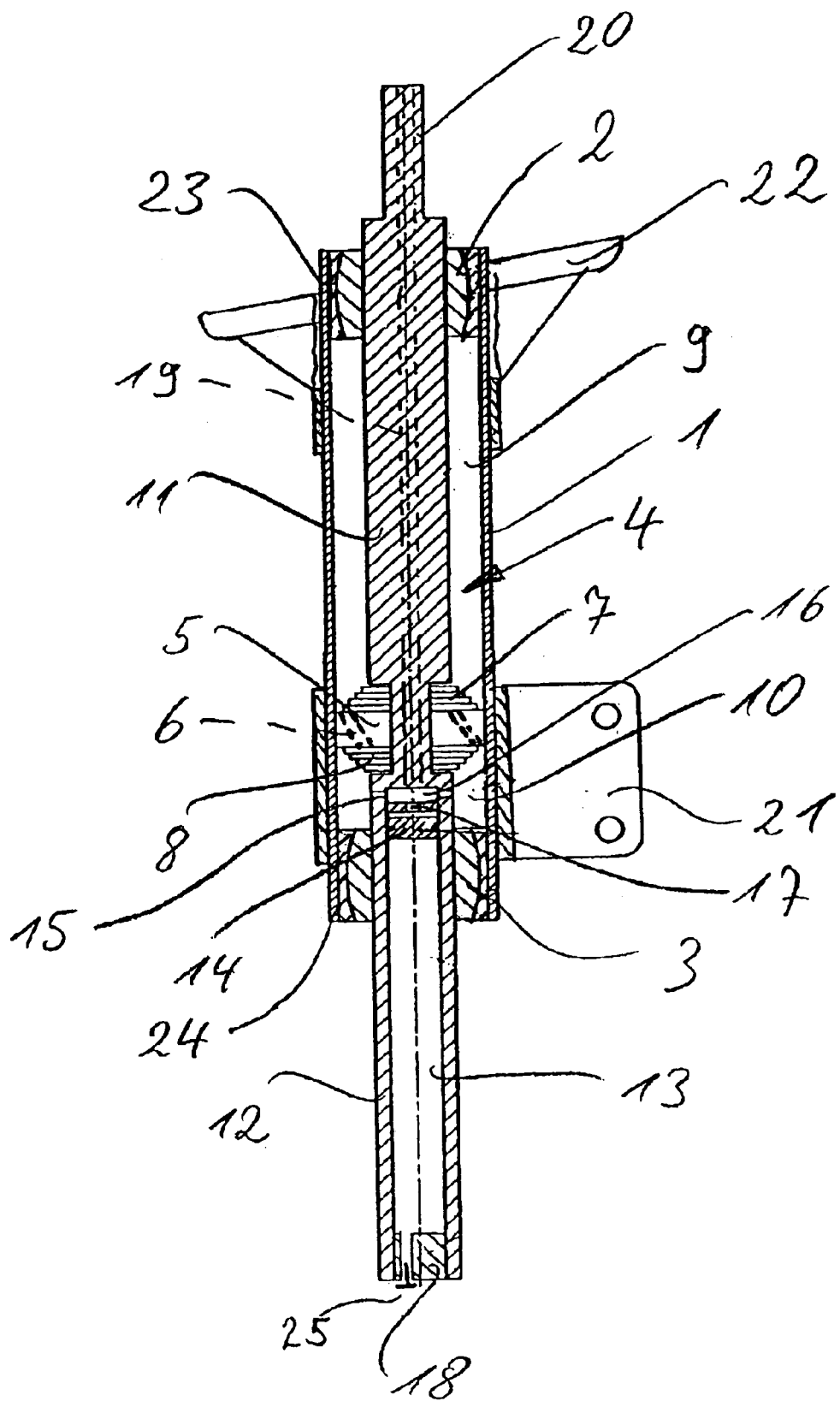

RESILIENT LEG

BACKGROUND OF THE INVENTION

The present invention concerns a resilient leg as part of an attachment for the wheel of a vehicle.

The overall design of such a resilient leg is generally known. A piston rod travels into and out of a housing. The inner end of the piston rod is provided with a shock-absorbing piston. The piston itself can be provided with channels and valves to establish a prescribed shock-absorption performance curve.

Resilient legs are attached, preferably at one end, to the vehicle's chassis. They are generally but not necessarily provided with a resilient disk to accommodate the base of a helical spring. The bottom of the leg is provided with a flange. Both the wheel bearing components and the wheel-turning rods are attached to the flange.

Since the wheel is attached remote from the leg's midline, the leg will need to transmit moments that express themselves as radial forces exerted on both the piston and the piston rod's upper guide. Attempts have of course been made to compensate for moments introduced by the wheel by tilting the disk and modifying the spring. This approach, however, is inadequate because the force of the moment varies with the vertical distance of the wheel from the chassis.

One attempt to compensate for these moments and their accompanying horizontal forces is illustrated in Figure 6.43, Reimpell-Stoll, Fahrwerktechnik: Stoss- und Schwingungsdämpfer, 1989. Here, the piston rod is radially supported by two separated bearings. This approach, however, is very complicated and is to some extent applicable only to light-weight legs.

SUMMARY OF THE INVENTION

The object of the present invention is accordingly to improve the generic resilient leg to the extent that moments of force will be reliably transmitted from the piston rod to the housing. Such a leg can be light in weight.

A resilient leg in accordance with the present invention has several advantages. First, moments of force exerted on the leg can be transmitted from the piston rod to the housing in accordance with the least possible radial forces. Second, the piston-rod alignment and sealing components will be subject to little friction, facilitating the rod's travel into and out of the housing. Finally, since the piston rod will need to transmit only slight angular moments, it can be thinner and hence lighter in weight.

BRIEF DESCRIPTION OF THE DRAWINGS

One embodiment of the present invention will now be specified with reference to the accompanying drawing. The single FIGURE is a section through a schematically depicted resilient leg.

DESCRIPTION OF THE PREFERRED EMBODIMENT

Although the resilient leg specified herein is single-cylinder, the present invention is also applicable to other designs, two cylinder versions for instance.

The leg is provided with a housing 1, a dashpot cylinder in the present embodiment. Each end of the housing is provided with a piston-rod alignment-and-sealing component 2 and 3, the details of which—the seal and low-friction bearing—are not illustrated.

A piston rod 4 travels into and out of housing 1 through openings in the center of each alignment-and-sealing component 2 and 3. A dashpot piston 5 is mounted on piston rod 4 half-way along it. In a known approach, piston 5 is provided with channels 6 that operate in conjunction with stacks 7 and 8 of cup springs to control the flow of fluid and accordingly establish a specified level of shock absorption.

Piston 5 divides the interior of housing 1 into two fluid-charged chambers 9 and 10. As piston 5 travels down, fluid will flow out of lower chamber 10 and into upper chamber 9 through channels 6, lifting upper cup-spring stack 7. As the piston travels up on the other hand, the fluid will flow in the opposite direction, lifting lower cup-spring stack 8.

Piston rod 4 is appropriately separated in the vicinity of piston 5 into two sections, an upper section 11 and a lower section 12, each with approximately the same diameter. Since sections 11 and 12 travel in the same direction, lower section 12 emerging from housing 1 as upper section 11 enters it, no fluid will, as at the state of the art, be forced out as the piston enters. It would accordingly seem unnecessary to provide a fluid-charged pressure compensation chamber. Such a compensation chamber 13, however, demarcated from the leg's fluid-occupied space by a partitioning piston 14, is in fact necessary to compensate for any thermal expansion on the part of the fluid. This function, however, requires only a little fluid.

Pressure-compensation chamber 13 can accordingly be in the form of a bore extending along the central axis of lower piston-rod section 12. Piston 14 moves back and forth inside this bore.

Lateral ports 15 allow a fluid-containing section 16 of lower section 12 to communicate with lower chamber 10. To prevent fluctuations in the pressure exerted by the fluid due to the shock-absorbing action of piston 5 from leading to unnecessary vibrations on the part of partitioning piston 14, the fluid containing length 16 of lower section 12 accommodates a constriction 17 that suppresses the fluctuations, especially the high-frequency fluctuations.

The bore that extends along the central axis of lower section 12 terminates in a base 18 that is not illustrated in detail. An unillustrated valve can be provided in the vicinity of base 18 to inject a cushion of air into pressure-compensation chamber 13 once the overall resilient leg has been entirely assembled and charged with fluid.

Upper section 11 can also include a central bore 19 to accommodate controls for establishing and regulating the widths of bypasses.

The outer end 20 of upper piston-rod section 11 is provided with means appropriate for attaching the resilient leg to the chassis of a vehicle. It can for instance have outside threads. Housing 1 is also conventionally provided with a flange 21 for attaching the wheel and its associated rods and with a resilient disk 22 to support the bottom of the helical spring.

To prevent overdetermination of the position of piston rod 4 in relation to its travel against the inner surface of housing 1, piston-rod alignment and sealing components 2 and 3' can pivot with three degrees of freedom around the end of the housing as indicated in the drawing by spherical surfaces 23 and 24.

A fluid injection valve 25 may be included at the end of the hollow outward-extending section 12.

List of Parts 1. housing
2. piston-rod alignment and sealing component 3. piston-rod alignment and sealing component
4. piston rod
5. piston
6. channels
7. upper cup-spring stack
8. lower cup-spring stack
9. upper housing chamber
10. lower housing chamber
11. upper piston-rod section
12. lower piston-rod section
13. pressure-compensation chamber
14. partitioning piston
15. port
16. fluid-containing length
17. constriction
18. base
19. bore
20. outer end
21. flange
22. resilient disk
23. spherical surface
24. spherical surface

What is claimed is:

1. A resilient leg as part of an attachment for a wheel of a motor vehicle, comprising a piston rod; (4) a piston attached to said piston rod and traveling into and out of a housing; a vehicle chassis; said piston rod having an outer end attached to said chassis; two separate pivotal bearings in said housing and fixed to said housing for maintaining said piston rod in radial alignment; said housing having an interior divided by said piston into two fluid charged chambers; said piston rod extending through both ends of the leg and being maintained in radial alignment at both ends of the leg by said two separated bearings, moments of force exerted on the leg being transmitted from said piston rod to said housing with minimum radial forces, alignment and sealing of said piston rod having minimum friction for travel of said piston rod into and out of said housing, said piston rod transmitting only substantially minimum angular moments.

2. The resilient leg as defined in claim 1, wherein said piston rod has two sections with substantially equal diameters.

3. The resilient leg as defined in claim 1, wherein said bearings pivot with three degrees of freedom around ends of said bearings relative to said housing.

4. A resilient leg as part of an attachment for a wheel of a motor vehicle, comprising a piston rod; a piston attached to said piston rod and traveling into and out of a housing; a vehicle chassis; said piston rod having an outer end attached to said chassis; two separate pivotal bearings in said housing and fixed to said housing for maintaining said piston rod in radial alignment; said housing having an interior divided by said piston into two fluid charged chambers; said piston rod extending through both ends of the leg and being maintained in radial alignment at both ends of the leg by said two separated bearings, moments of force exerted on the leg being transmitted from said piston rod to said housing with minimum radial forces, alignment and sealing of said piston rod having minimum friction for travel of said piston rod into and out of said housing, said piston rod transmitting only at least one hollow out-ward-extending section accommodating a pressure-compensation chamber; a partitioning piston demarcating said pressure-compensation chamber, a space opposite said pressure-compensation chamber and inside said outward-extending section communicating hydraulically through hydraulic means with an adjacent chamber in said housing.

5. The resilient leg as defined in claim 4, including a constriction inside said outward-extending section and between said partitioning piston and said hydraulic means.

6. The resilient leg as defined in claim 4, including a fluid injection valve at an end of the hollow outward-extending section.

* * * * *